United States Patent [19]
Benson et al.

[11] Patent Number: 5,716,013
[45] Date of Patent: Feb. 10, 1998

[54] POLYGON-SHAPED ROTATABLE APPARATUS AND ITS USE IN COMPOSTING AND CEMENT INDUSTRIES

[76] Inventors: Jack M. Benson, 6601 Ammendale Rd., Beltsville, Md. 20705; T. R. Sundaram, P.O. Box 1131, Columbia, Md. 21044

[21] Appl. No.: 429,496

[22] Filed: Apr. 26, 1995

[51] Int. Cl.⁶ ............................................. B02C 19/00
[52] U.S. Cl. ........................ 241/33; 241/38; 241/57; 241/299
[58] Field of Search ................. 241/57, 36, 299, 241/72, 285.1, 176, 177, 178, 179, 180, 33, 38

[56] References Cited

U.S. PATENT DOCUMENTS

| | | | |
|---|---|---|---|
| 1,468,893 | 9/1923 | Wolever | 241/182 X |
| 2,098,054 | 11/1937 | McBerty | 241/180 X |
| 2,470,315 | 5/1949 | McGeehee | 241/178 X |
| 2,837,289 | 6/1958 | Heckett | 241/178 X |
| 3,405,873 | 10/1968 | Gothard et al. | |
| 3,451,799 | 6/1969 | Brown | |
| 3,679,142 | 7/1972 | Gothard | |
| 3,930,799 | 1/1976 | Eweson | |
| 3,966,415 | 6/1976 | Chester | |
| 4,032,075 | 6/1977 | Tyer | 241/176 X |
| 4,042,219 | 8/1977 | Terry | |
| 4,204,959 | 5/1980 | Kreuzburg et al. | |
| 4,231,874 | 11/1980 | Heiligtag | |
| 4,243,521 | 1/1981 | Tharp et al. | |
| 4,377,258 | 3/1983 | Kipp, Jr. | |
| 4,540,467 | 9/1985 | Grube et al. | |
| 4,632,692 | 12/1986 | Lebesgue et al. | |
| 4,797,367 | 1/1989 | Pinder | |
| 4,798,802 | 1/1989 | Ryan | |
| 5,023,178 | 6/1991 | Schiene et al. | |
| 5,024,770 | 6/1991 | Boyd et al. | |
| 5,169,782 | 12/1992 | Murphy et al. | |
| 5,256,378 | 10/1993 | Elston | |

FOREIGN PATENT DOCUMENTS 229302  7/1960  Australia ................. 241/36

OTHER PUBLICATIONS

R. T. Haug, "The Practical Handbook of Compost Engineering", *Composting Systems*, pp. 21–93, (1993).

*Primary Examiner*—Mark Rosenbaum
*Attorney, Agent, or Firm*—Foley & Lardner

[57] ABSTRACT

An apparatus of an elongated polygon-shaped vessel having a longitudinal axis, and an internal volume, wherein the elongated vessel is rotatably mounted about its longitudinal axis, and wherein optionally, the internal volume is divided into a plurality of transverse chambers having a polygonal cross-section shape, and can optionally be further divided into a plurality of longitudinal sections, an inlet for receiving material, and an outlet for removing material, is useful, for example, as a composter for municipal solid waste (MSW), source separated organic waste, yard waste, sewage sludge, and of organic hazardous waste, as a wet mill to reduce the sizes, mix, and screen materials, such as MSW, source separated organic waste, yard waste, sewage sludge, and organic hazardous waste, and as a rotating vessel, such as a cement kiln or ball mill.

17 Claims, 11 Drawing Sheets

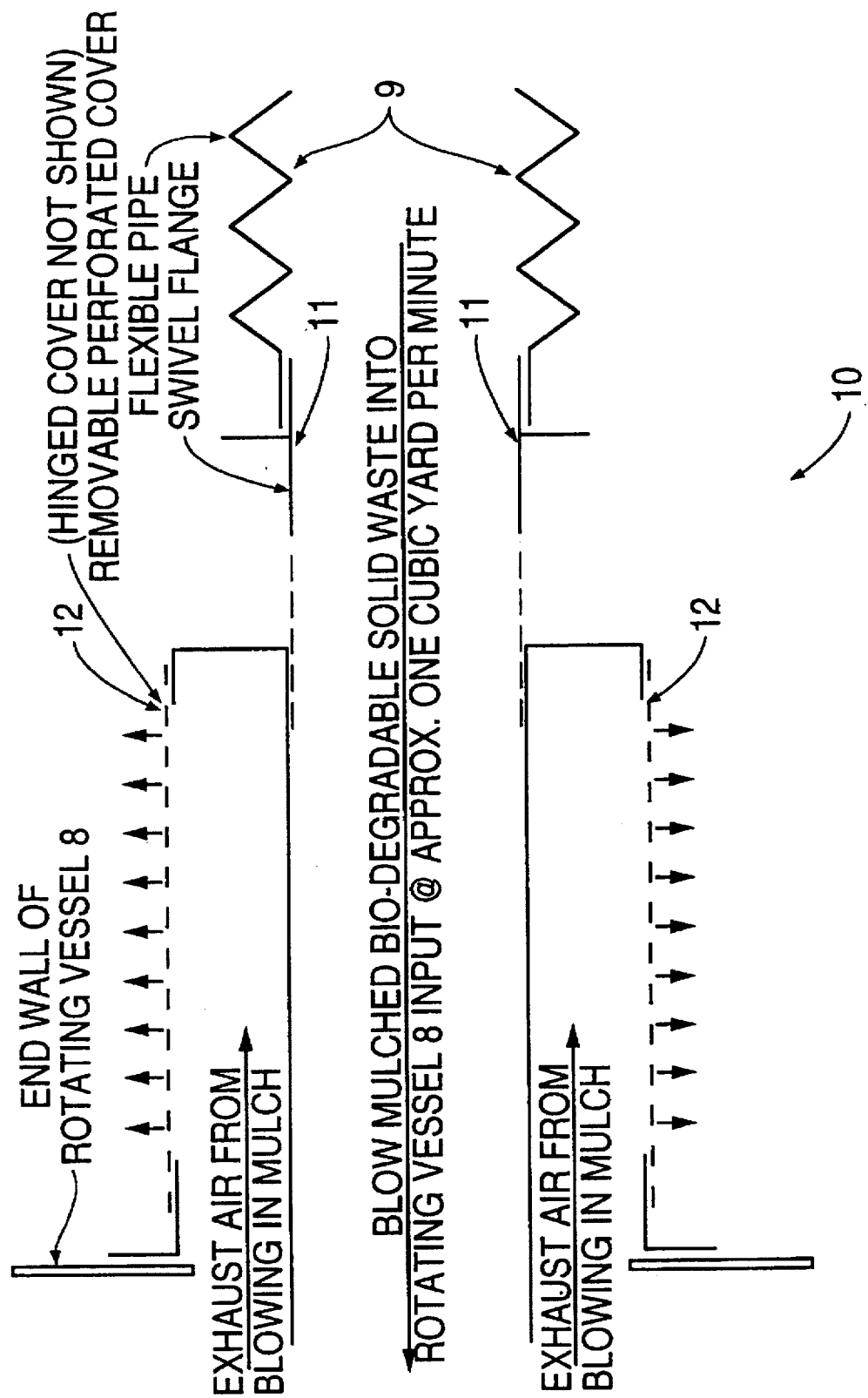

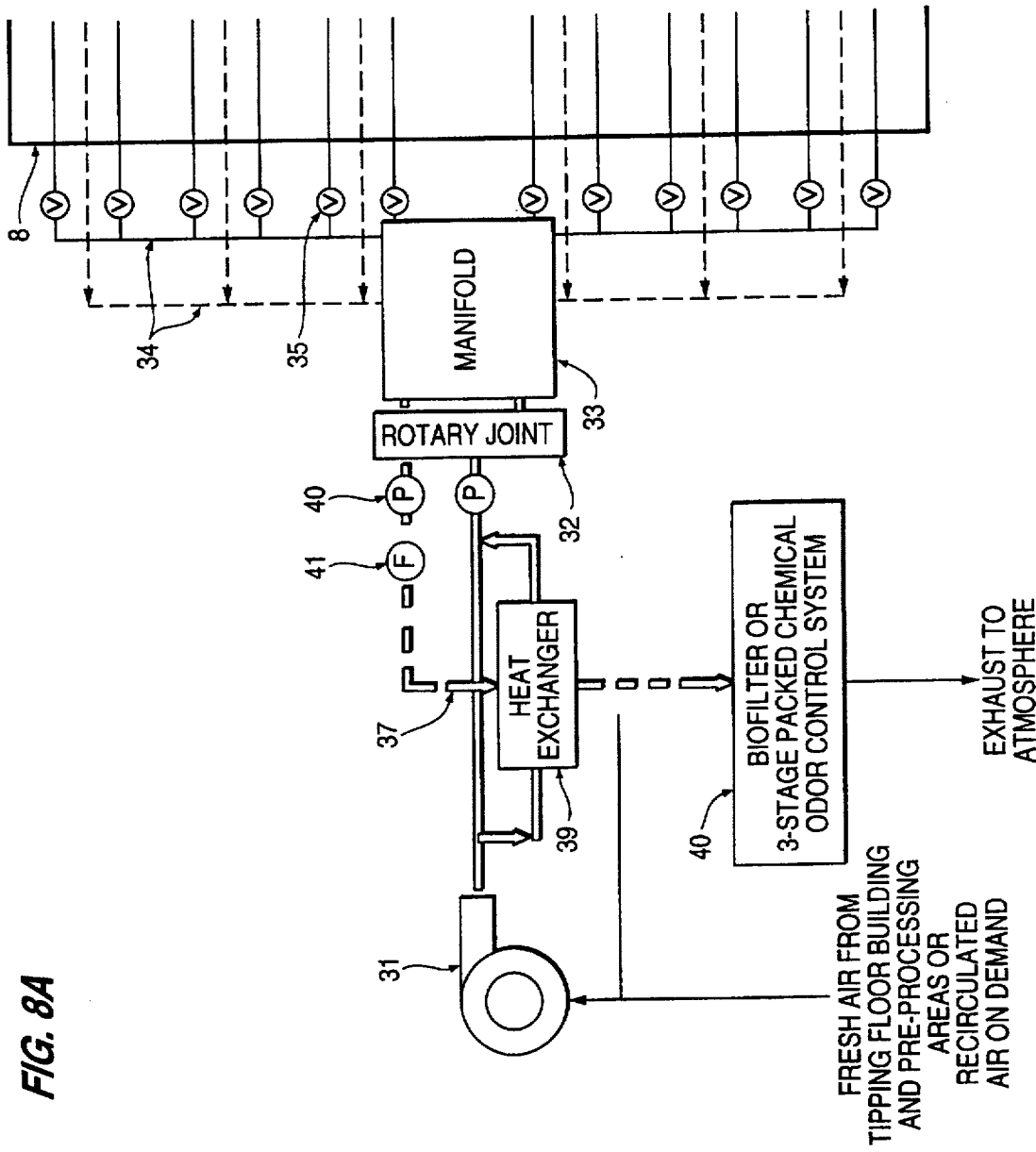

POLYGON-SHAPED ROTATABLE APPARATUS AND ITS USE IN COMPOSTING AND CEMENT INDUSTRIES

BACKGROUND OF THE INVENTION

1. Field of the Invention

The present invention relates to a method and apparatus for the composting of bio-degradable organic waste material, for example, municipal solid waste (MSW), source separated organic waste, yard waste, and sewage sludge. More particularly, the invention relates to the aerobic composting of MSW, and to a process and device which accomplishes this in such a way as to reduce or prevent the formation of odorous and/or explosive gases and to produce a compost product of high quality.

The present invention also relates to an apparatus useful as a rotary wet mill, rotary mixer, and rotary screen which can be used, for example, to pre-process bio-degradable waste in a composting process.

The present invention also relates to a series of apparatuses useful as a large rotating vessel; for example, a cement kiln or ball mill, and methods of using such series.

2. Description of Related Art

The proper and safe disposal and/or processing of municipal solid wastes has become a problem of worldwide dimensions in general and of some urgency in the United States in particular. The traditional method of disposal in small, neighborhood landfills is becoming more unacceptable, both because of the lack of availability of new sites and the environmental hazards associated with the leachate oozing out of unlined landfills. Even in landfills in which synthetic liners are used to prevent the leachate from escaping into the surrounding soils, it is recognized that it is only a matter of time before the integrity of the liner is comprised.

The alternative of mass burning of municipal solid wastes has equally unacceptable environmental and health consequences, since incineration produces air pollutants containing trace heavy metals, dioxins and furans, which may be potential carcinogens. Moreover, the unburned bottom residue from the incinerators as well as the fly ash from the associated air-pollution control devices may also be hazardous and pose disposal problems, requiring specially-designed, lined "monofills".

Since typically two-thirds by weight of MSW comprises biodegradable matter, conversion of this fraction to compost, which is a useful soil amendment, is an attractive option. Indeed, the U.S. Environmental Protection Agency (EPA) has ranked recycling, including composting, ahead of incineration and landfilling for desirability among available MSW disposal options. However, existing MSW composting plants have been plagued by major problems, including, generation of malodorous gases, poor quality of the compost, and undesirable high costs of producing the compost.

Organic contents of MSW, such as food scraps, paper products and yard wastes, comprise complex molecules containing carbon, hydrogen and nitrogen. Composting is essentially the breakdown, by naturally occurring microorganisms, of these complex molecules into simpler ones, so as to produce a humus-like residue, which is an excellent soil amendment. When biodegradation occurs in the absence of oxygen, the carbon and hydrogen atoms in the organic matter combine to produce methane ($CH_4$), which is an explosive gas. Similarly, the nitrogen and hydrogen in the organic molecule yield ammonia ($NH_3$), which is a malodorous and toxic gas.

On the other hand, when an abundance of oxygen (or air) is present, the carbon in the organic molecules will combine with the oxygen to give carbon dioxide ($CO_2$), while the hydrogen will combine with the oxygen to give water ($H_2O$). Biodegradation in the presence of oxygen is termed aerobic digestion; different classes of microorganisms are involved in the two types of biodegradation. In particular, aerobic microorganisms will thrive only in the presence of oxygen.

While many composting systems claim to employ aerobic digestion, the fact that they produce malodorous ammonia and explosive methane necessarily implies that anaerobic conditions must exist, at least locally, in the composting mass. The present invention avoids or at least reduces the formation of malodorous and/or explosive gasses by ensuring that aerobic conditions exist within the composting mass, thereby eliminating the need for the expensive odor control devices required by other composting systems.

One of the simplest and widely used methods of composting is to lay out the material in long 'wind rows', or within trenches, and to let the biodegradation proceed naturally. In addition to any natural aeration through the sides and top of the piles, such "static piles" may be provided with forced aeration from air conduits located at the bottom of the piles. When only natural aeration is used, extensive anaerobic regions may develop within the piles, since for practical reasons the piles are usually several feet wide and several feet high, and penetration of outside air into the interior of the piles is necessarily inadequate to maintain aerobic conditions.

Even when forced aeration is supplied to such static piles through air holes at the bottom of the piles, the air will tend to channel along fixed paths of least resistance, so that regions away from the channels will not receive adequate supplies of oxygen and anaerobic conditions will develop. This feature is evidenced by the fact that when such piles are periodically (once every few days) turned with mechanical equipment so as to provide more homogeneous conditions, considerable amounts of odorous gases are released to the surrounding air.

Measurement of oxygen levels made within active compost piles indicate that the available oxygen is depleted by the aerobic microorganisms present within the piles within a matter of minutes. Thus, the aerobic microorganisms will perish, giving way to the rise of anaerobic microorganisms, unless adequate fresh air is supplied to all parts of the composting mass.

Attempts have been made to improve on the aforementioned static pile method by enclosing the compost inside a longitudinal hollow chamber and by providing various means, such as hydraulic rams, moving floors and the like, to slowly advance the compost longitudinally along the chamber, thereby providing some agitation. For example, in U.S. Pat. No. 4,798,802 a plug-flow reactor is proposed, in which longitudinal reciprocating slats at the bottom of a rectangular chamber are used to advance the compost along the reactor, with air being supplied through aeration conduits located between the reciprocating slats. However, since this patent proposes a cross section which is about 10' square for the reactor, with the organic material filling it to the top, it is quite unlikely the upper layers of the material will receive either adequate agitation or aeration.

The methods of composting described above are disadvantageous because a very long residence time of the organic material is needed for the composting. For example, allowing the composting to occur in a static pile can require from six months to a one year residence time. Using wind rows can take between three and six months depending upon the frequency of aeration and agitation. Using tunnel or plug-flow reactors, requires a residence time of two to three months dependent upon frequency of aeration and agitation.

An effective way of obtaining adequate agitation is to perform the composting operation within a rotating cylindrical drum and thereby reduce residence time. Indeed, a number of patents exist based on the rotating drum concept. Conventional rotating cylindrical drums, with capacity limited by shippable diameters, generally have a residence time of only three to five days, followed by one to two months in a wind row or tunnel reactor.

U.S. Pat. No. 3,405,873 describes a refuse treating apparatus comprising a horizontally mounted cylindrical drum which contains vanes inside the drum.

U.S. Pat. No. 3,679,142 describes an apparatus for treating refuse comprising a rotatable cylindrical drum, and means within the drum for effecting a pulverizing action upon refuse fed into the drum.

U.S. Pat. No. 3,930,799 describes an apparatus for making organic fertilizer which includes a rotating digester cylinder provided with a series of knives which gradually cut and shred the softer components of the raw material and a series of heavy chains which crush and grind hard and brittle components of the raw material, while the material is in a process of fermentation. The rotating cylinder may be divided into a plurality of longitudinal compartments by transverse partitions.

U.S. Pat. No. 4,204,959 describes an apparatus for the treatment and composting of biological waste which comprises a hollow cylinder mounted for rotation about its longitudinal axis and a second hollow cylinder mounted within the first cylinder for conjoint rotation therewith.

U.S. Pat. No. 5,169,782 describes an apparatus and method for processing organic refuse. The apparatus comprises a rotating digester cylindrical tube which has a number of agitating vanes extended along the length of the tube into longitudinal compartments.

While some rotating cylindrical drums of the above-mentioned type have achieved a certain degree of commercial utility, there are deficiencies in these prior apparatuses. For example, each of the above patents describe rotatable cylindrical drums, which are generally fabricated in a factory and then shipped to a site. It is disadvantageous that the drums are fabricated in a factory because it is often not easy to tailor the size of the drum to the appropriate on-site needs. Also, the length and diameters of the drums are limited to sizes which can be shipped to the site.

Moreover, because of the tremendous volume of trash produced daily, to date it has not been economically feasible to compost the biodegradable portion of MSW to full maturity in such factory fabricated rotating cylindrical drums, which are limited to shippable diameters and lengths. The largest rotating drum believed to currently be in use in the composting industry is approximately 12.5' diameter× 185' long with a volume of 20,358 cubic feet.

Also the cylindrical drums of the prior art generally do not contain the necessary features to maintain an aerobic composting condition for the period of time necessary to achieve mature compost. For example, the diameter and length of the cylindrical drums and means for supplying air and water are often ineffective in maintaining aerobic conditions throughout the composting process.

Accordingly, there is a need for rotatable vessels which overcome the drawbacks of the prior art drums discussed above, and which are useful in composting processes.

Rotating vessels are also used in other areas, such as in cement kilns, wet mills, and ball mills. The prior art kilns and mills, however, are generally cylindrical drums which are factory fabricated and thus subject to the limitations discussed above, including subject to shippable dimensions.

Accordingly, there has been a need to provide rotatable vessels which are more cost efficient and which can be fabricated on site to any desired dimensions.

SUMMARY OF THE INVENTION

It is an objective of the present invention to provide a method and apparatus for the efficient processing of organic material, particularly using a composting apparatus and process, which overcomes the drawbacks of the prior rotatable cylindrical drums.

It is another objective of the invention to provide such a method and apparatus that can be economically constructed on site and operated in a cost-effective manner.

It is also an objective of the invention to provide an apparatus and method which can maintain aerobic composting conditions so as to achieve effective and efficient composting of waste, such as MSW, source separated organic waste, yard waste, and sewage sludge.

It is also an objective of the invention to provide an apparatus which is useful as a rotating vessel, such as a cement kiln or ball mill, which overcomes the deficiencies in prior vessels as noted above, and to provide a process using the same.

It is also an objective of the invention to provide an apparatus which is useful as a wet mill, mixer, and screen which overcomes the deficiencies noted above and to provide a process using the same.

In accordance with these and other objectives, there has been provided, in the first aspect of the present invention, an apparatus comprising an elongated vessel having a longitudinal axis, and an internal volume, wherein the elongated vessel is rotatably mounted about its longitudinal axis, wherein the elongated vessel has a polygonal cross-section, an inlet for receiving material, and an outlet for removing material.

In accordance with another aspect of the invention, there has been provided a method of composting organic material, comprising placing organic material to be composted into the elongated vessel described above, allowing the material to compost by rotating the elongated vessel, supplying air of a temperature and water as needed to maintain aerobic composting conditions, and removing the material from the apparatus.

In accordance with another aspect of the invention, there has been provided a wet mill comprising an elongated vessel having a polygon shape and a longitudinal axis, and an internal volume, wherein the elongated vessel is rotatably mounted about its longitudinal axis, an inlet for receiving material, and outlets for removing material.

In accordance with another aspect of the invention, there has been provided a process for using the above wet mill comprising adding desired materials to the rotating wet mill to achieve the desired mixing, particle size reduction, and screening.

In accordance with another aspect of the invention, there has been provided a rotating vessel, such as a cement kiln or a ball mill, and a method of using such a vessel, comprising an elongated vessel having a polygon cross sectional shape and having a longitudinal axis, and an internal volume, where in the elongated vessel is rotatably mounted about its longitudinal axis and inlet for receiving material, and an outlet for removing material.

Further objects, features, and advantages of the present invention will become apparent from the detailed description of the invention which follows.

BRIEF DESCRIPTION OF THE DRAWINGS

FIG. 6 is an assembly for mulched solid waste input and air exhaust from a rotatable elongated vessel;

FIG. 8A is a schematic of an ventilation system;

DETAILED DESCRIPTION OF THE PREFERRED EMBODIMENTS

Figure 1:
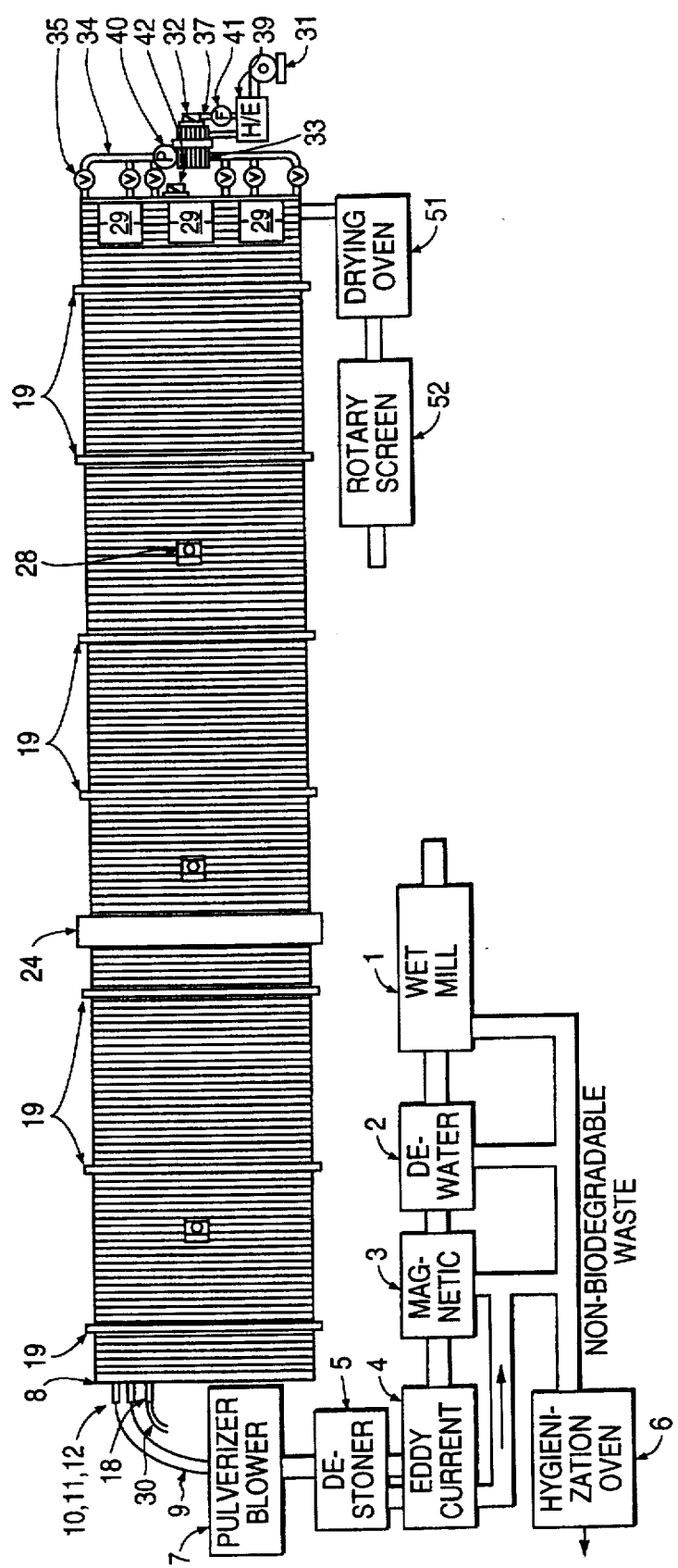
FIG. 1 is a plan view of an example of an apparatus according to the invention, including the rotatable elongated vessel and peripheral equipment thereto.

The apparatuses and processes of the invention will be described in greater detail with reference to the accompanying Figures. In the Figures, like numbers represent like parts. These Figures represent only examples of apparatuses and processes within the scope of the invention, and do not limit or restrict the scope of the invention. The description below is primarily with reference to use of the apparatus as a composter for waste material, such as MSW. However, as will be discussed in greater detail hereinafter, the apparatus, namely the rotatable polygon vessel, can also be used as a wet mill, mixer, and screen or in applications where a rotating vessel is used, for example, as a cement kiln or ball mill, with slight modification of the apparatus tailored to the intended use.

An example of a process stream which involves use of the apparatus of the invention in a composting process is described with reference to FIGS. 1 through 9.

Material from any source which is desired to be composted, may be provided to the elongated rotatable vessel 8 (hereinafter referred to as a vessel, the vessel is preferably, not cylindrical, but is in the shape of a polygon). Generally, either waste, such as MSW, source separated organic waste, yard waste and/or sewage sludge, or other materials, if the apparatus is a cement kiln or ball mill, is added to the vessel 8. Hazardous organic waste can also be used. The material may be added in any desired manner to the vessel 8. For example, with reference to FIG. 7, prior to entering the vessel 8, material, such as MSW from, for example, garbage trucks, is dumped from an elevated unloading building onto a tipping floor below. Alternatively, the garbage trucks drive into the tipping floor building and dump MSW directly into a hopper (not shown) that feeds the wet mill 1. A typical input of MSW unloaded into the unloading building is 250 tons MSW per day. A typical input onto the tipping floor is 21,000 cubic feet per day.

On the tipping floor the solid waste may be inspected to remove any hazardous waste and/or large, non-biodegradable objects. The solid waste is moved, for example, by a front end loader, into a slot in the tipping floor falling into the wet mill hopper below. Alternatively, the solid waste may be moved by a conveyor belt (not shown) to the wet mill 1.

The wet mill 1 is a device which mixes and pulverizes the organic waste in the presence of water, and screens by size, so as to provide material which is more readily subject to composting. Prior composting techniques have used various types of grinders or hammer mills to reduce the particle size of the organic waste and have used various other devices to mix and screen the incoming waste. The present inventors, however, have found it desirable to use a wet mill to reduce the particle size, mix, and screen the incoming solid waste. The wet mill may be any rotating vessel which by the action of water in the rotating vessel reduces the particle size of the organic waste as it mixes and separates the incoming waste. It has also been found that wet mills having a polygon shape are especially advantageous.

In a preferred embodiment, the wet mill 1 comprises a horizontal rotary pulverizer, mixer, and screen that is a cylinder or preferably a polygon which is rotatable, with a preferred range of 8 to 15 RPM. In industrial applications it should have a preferred through-put capacity of 10 to 50 tons per hour of incoming waste. In an especially preferred embodiment, the wet mill is a polygon shape formed from metal plates. The preferred diameter of the wet mill 1 is from 8' to 30', and the preferred length from 30' to 200'. In home or laboratory use, however, the dimensions may be appropriately scaled downward.

The wet mill 1, in contrast to the rotatable vessel 8 discussed below, generally contains only one longitudinal and transverse compartment. The wet mill is rotatable and supported by drive wheels (not shown). There is no need to add oxygen or to monitor the conditions of the wet mill 1, as discussed below with reference to the vessel 8, since aerobic conditions are not needed in the wet mill 1. The purpose of the wet mill 1 is to reduce the particle size, thoroughly mix the incoming waste stream, provide preliminary screening by size, and establish a moisture content of the resultant mulch of approximately 40% to 60%, with a preferred moisture content of 52% by weight.

The wet mill 1 generally has forward inclined agitation-lifting vanes (not shown) that continually tumble the waste forward in such a manner that the waste becomes thoroughly mixed as it advances. The relatively fast operating speed along with the addition of large amounts of water, approximately 130 gallons per ton of MSW, or as required to obtain the desired moisture content, acts to achieve particle size reduction. Particle size reduction is accomplished by adding water to the incoming waste stream to reduce the shear and tensile strength of the paper and cardboard products of the MSW. As the wet mass is repeatedly picked up and dropped by lifting agitation blades (not shown) in the wet mill 1 due to the rotation of the wet mill 1, the MSW will quickly mulch. The interior of the wet mill 1 may contain fixed knives (not shown) which serve to cut plastic and/or other protrusions which enhance the reduction of the particle sizes of the MSW.

The wet mill 1 serves to not only reduce the particle size of the MSW but also to thoroughly mix and separate by size the incoming solid waste. Removable and exchangeable inner perforated liners (not shown) with, for example, 0.75" to 2" slotted holes, with 1.5" slots being preferred, located at the end of the wet mill 1 separate the mulched sizes from the larger inserts. The larger particle sizes that do not fall through the slots, exit into a separate hopper (not shown) and are conveyored for further processing.

The use of a wet mill 1 to reduce particle size of the organic waste offers significantly less operating and maintenance costs than conventionally used hammer mills or grinders, while, advantageously thoroughly mixing, and separating by size the incoming waste.

The bio-degradable mulch and smaller sizes which go through the screen or perforated liner, exit into a 2nd hopper (not shown) and are conveyored to an optional de-watering process 2, which, if necessary, may be accomplished in any desired manner to remove any excessive water from the product which exits the wet mill 1. The desired water content of the product is 40% to 60%, by weight, preferably 52% after the de-watering step.

Next automatic and/or manual separation of inserts from bio-degradable waste may be accomplished using conventional equipment. Any undesirable component which is not readily compostable may be removed. For example, magnetic separator 3 separates ferrous metals, aluminum eddy current separator 4 removes aluminum, and a destoner 5 removes glass. The separated recyclables (as well as the large size rejects from the wet mill 1) then exit through a hygienization oven 6 to kill pathogens. These rejects from the incoming waste stream are then sent to a landfill or recycled as desired.

The product of smaller size, for example of 1.5" and smaller bio-degradable mulch, may be conveyored to a custom made pulverizer/blower 7 that further reduces the particle size, for example, to less the 0.75".

The pulverized bio-degradable waste enters the composting polygon-shaped vessel 8, in any desired manner, preferably without stopping the rotation of the vessel during this loading process.

For example, the blower 7 blows the organic waste at high velocity via a flexible pipe 9, see FIG. 1, through the Input/Air Exhaust Assembly 10 into the rotating polygon vessel 8, see FIG. 6. The end swivel flange 11 of the flexible pipe 9 swivels outside the blower output pipe and/or inside the assembly input pipe sleeve (not shown) as the vessel 8 slowly rotates at, for example, approximately 10 to 120 revolutions per hour. This assembly input pipe sleeve is a solid cylinder that terminates inside the rotating vessel 8. As shown in FIG. 6, the assembly 10 has an outer perforated, removable for cleaning, cylinder 12 that also terminates inside the vessel 8. This outer perforated cylinder 12 allows for the exhaust of the air from the vessel 8 that the blower 7 has blown into the vessel along with the mulch. For example, a 75 to 100 horsepower blower may utilize 15,000 to 20,000 CFM of air to blow the organic waste from the pulverizer 7 through the flexible pipe 9 toward the rear of a chamber in the 1st longitudinal section of the vessel 8. The perforated cylinder has hinged cover plates (not shown) to seal the vessel 8 after the chamber is filled.

In an alternative embodiment (not shown), the loading may be accomplished without stopping the rotation of the vessel by means of a cylindrical ram that is located in the bottom of a hopper that has a cylinder extending out its bottom end that terminates inside of a "pipe sleeve". This pipe sleeve, which is located at the horizontal axis of rotation of the vessel 8 and serves as a swivel, terminates in a loading manifold that is approximately the full cross sectional size of the vessel 8. The loading manifold is an extension of the rotating vessel 8. This manifold is partially internally divided, for example, into six open triangular loading compartments with a large cylindrical open area at the exit of the pipe sleeve and at the center of the cross section. Each loading compartment has its own triangularly shaped ram to push the biodegradable waste into its adjacent composting chamber. The loading is accomplished while the loading compartment is at, or near, the bottom of the vessel's revolution and the ram is extracted from the composting chamber at, or near, the vessel's top of rotation.

The large field fabricated rotatable vessel 8 is preferably constructed in the form of a polygon with a minimum of three sides. The vessel 8 may have any desired length and diameter. Polygons having any desired number of sides can be used. The vessel 8 may be insulated in any desired manner to conserve heat. The preferred design has six triangular chambers transversely (See FIGS. 3 and 4) and two to four longitudinal sections. Each chamber in the preferred design is an equilateral triangle with, for example, 12.5' sides, but shorter and longer sides may be desired. The length of the longitudinal sections is determined by the volume of MSW to be processed on a daily and weekly basis. It is anticipated that lengths of 40' to 400' will be generally used, but shorter and longer lengths may be desired. For example, in home or laboratory applications all dimensions would be appropriately scaled downward.

Figure 2:
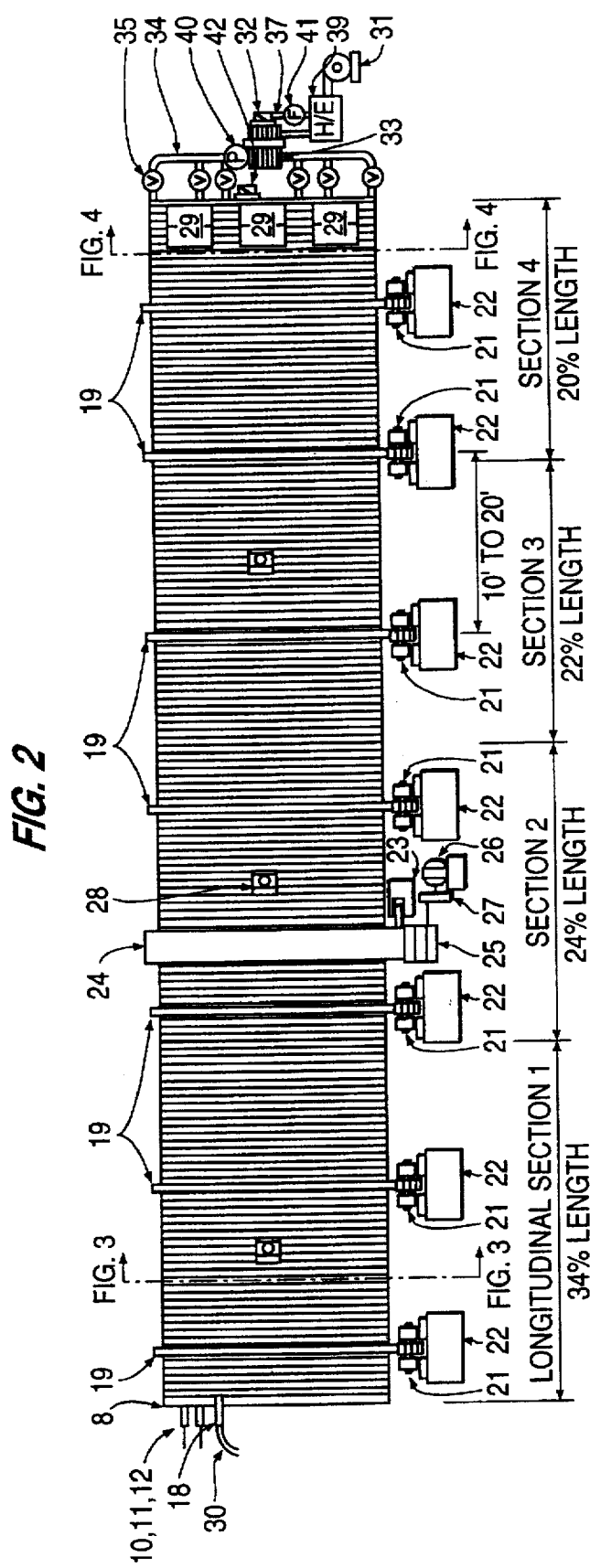
FIG. 2 is a side elevation of a rotatable elongated vessel according to the invention.

The transverse chambers may extend from the front end to the back end of the vessel 8, or preferably divided by transverse partitions which thereby divide the vessel 8 into longitudinal sections. The longitudinal sections and transverse chambers are preferably closed, except for transfer doors 16 located in bulkheads 15 that separate adjacent longitudinal sections as indicated in FIG. 2 and shown in FIGS. 5A and 5B. However, it may be desired to have transfer doors connecting the transverse chambers, as well.

Figure 3:
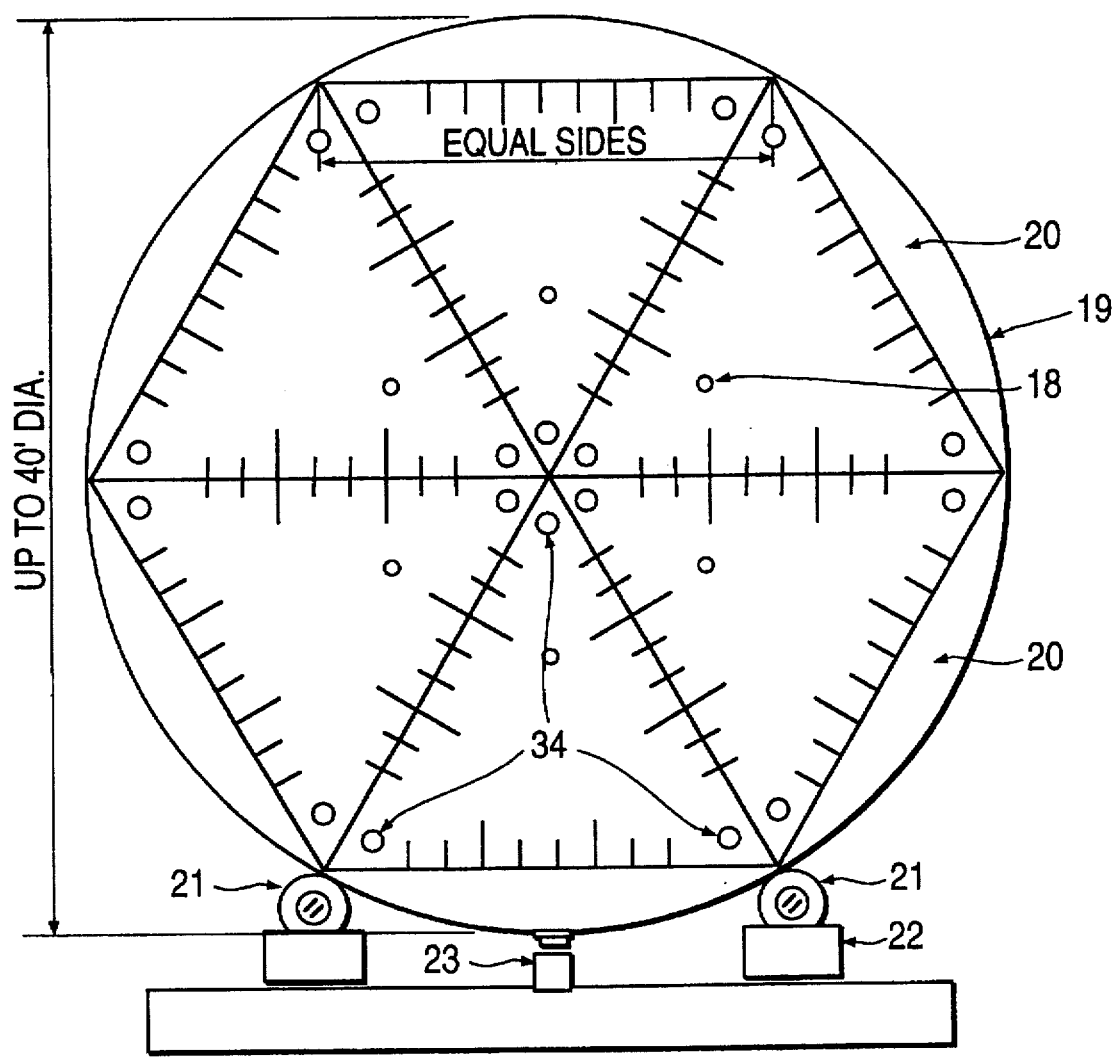
FIG. 3 is a section of a rotatable elongated vessel at support wheels.
Figure 4:
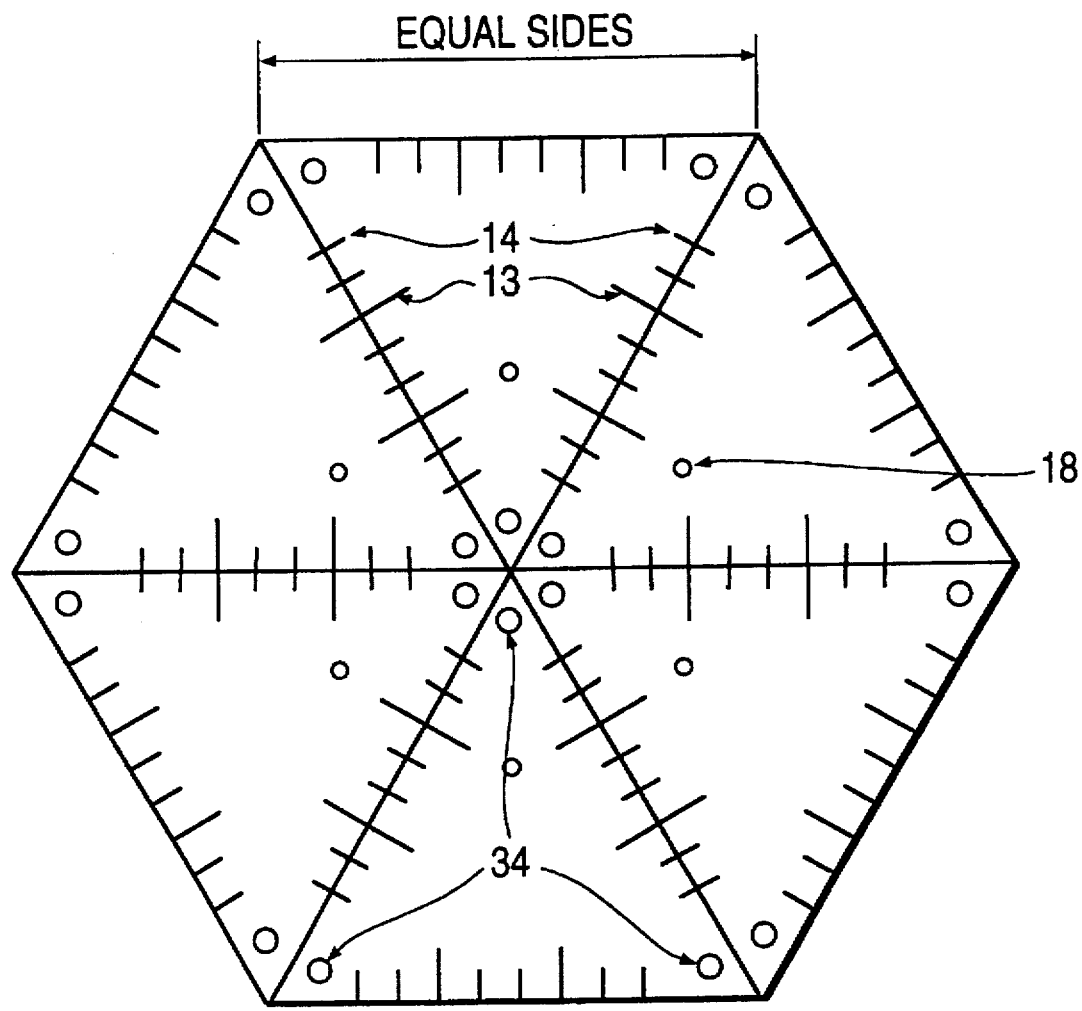
FIG. 4 is a section of a rotatable elongated vessel between the support wheels.

The vessel 8 may be divided transversely in any manner desired, preferably into six transverse chambers as shown in FIGS. 3 and 4. The vessel 8 may be divided longitudinally into one or more sections, preferably four as indicated in FIG. 2, in any desired manner, for example, by bulkheads 15 provided at desired intervals that divide the length of the vessel 8, to allow a batch-continuous flow of composting material through the vessel 8. In the preferred design the longitudinal sections are progressively shorter as the composting process digests the carbon and loses, for example, approximately 50% of its volume. That is, each longitudinal section is shorter than the prior section as the volume reduces. The preferred use of the vessel 8 in composting organic waste is to retain the composting mass in each longitudinal section for five to seven days before transferring this composting mass through the transfer door 16 into the next section. The total residence time inside the vessel 8 will generally vary from approximately one to four weeks. The multiple transverse chambers and longitudinal sections advantageously permits batch processing and lower air pressure to ventilate the composting mass.

Figure 5A:
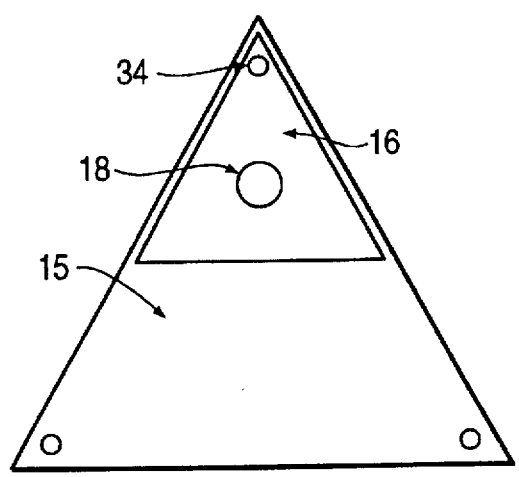
FIG. 5A is a front elevation of a transfer door in a movable section of a bulkhead according to the invention.
Figure 5B:
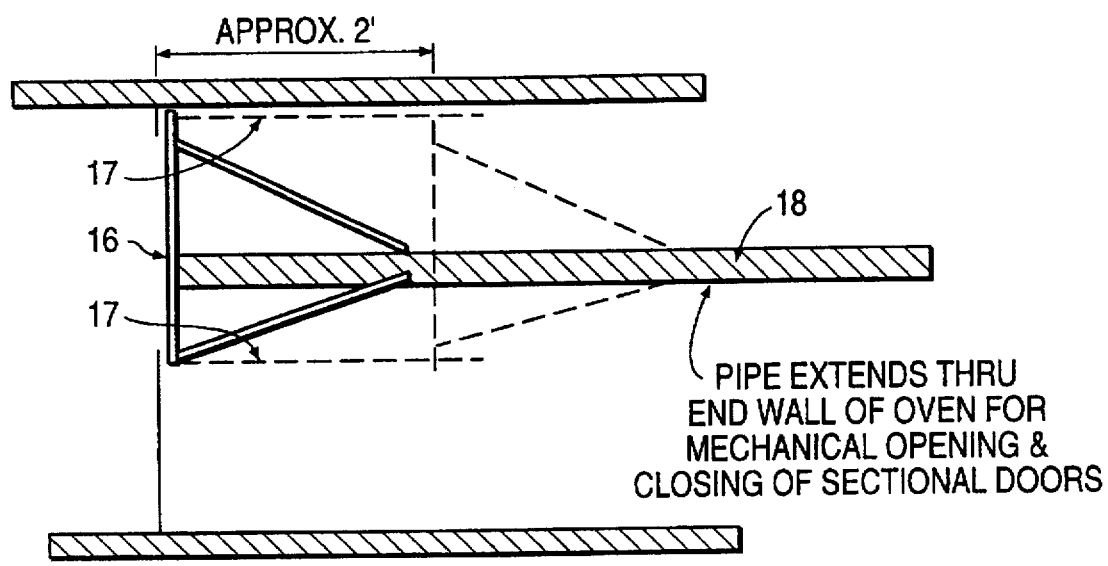
FIG. 5B is a section of a transfer door in a movable section of a bulkhead according to the invention.
Figure 7:
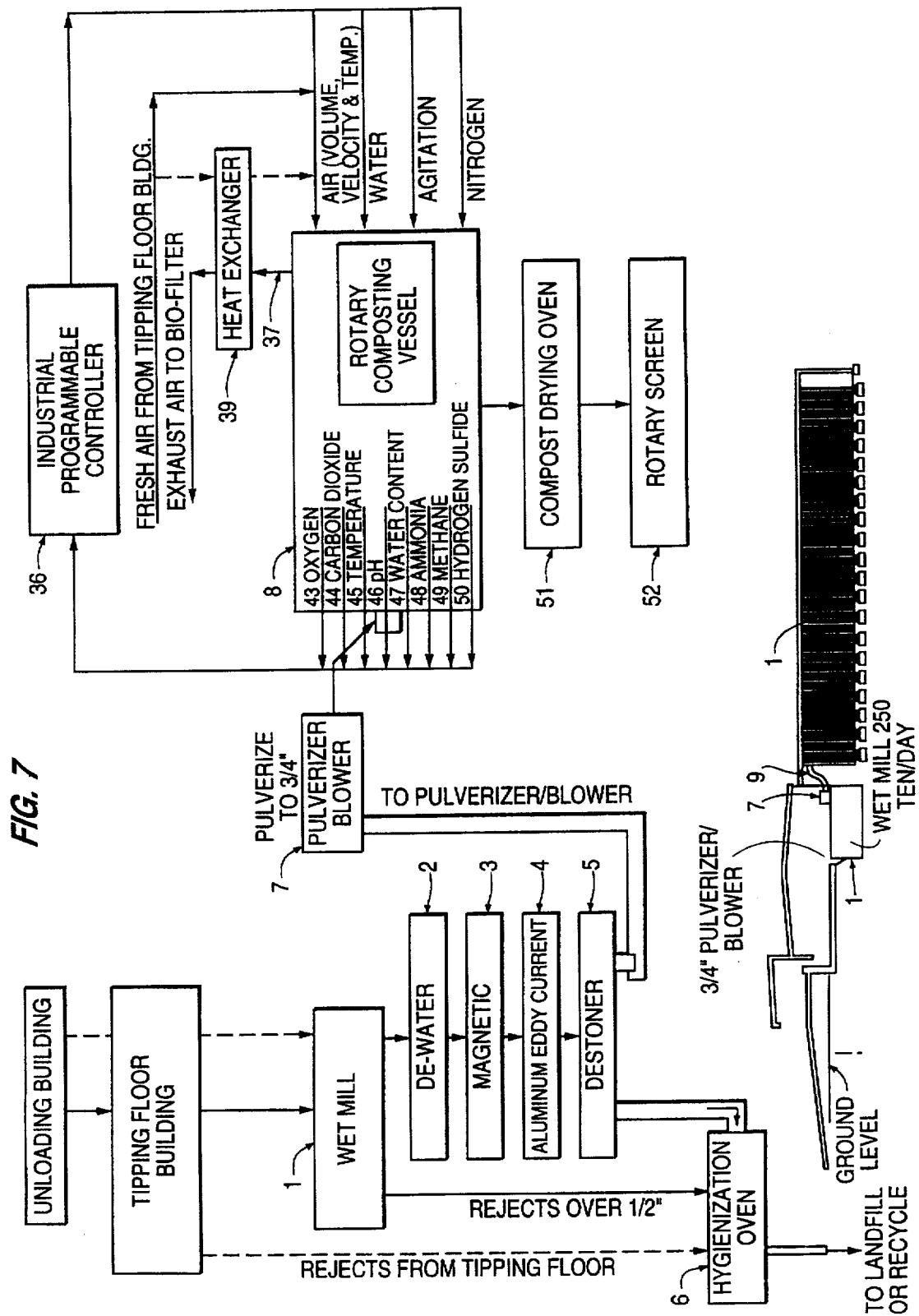
FIG. 7 is a process flow chart of a composting process which uses apparatuses of the invention.
Figure 8B:
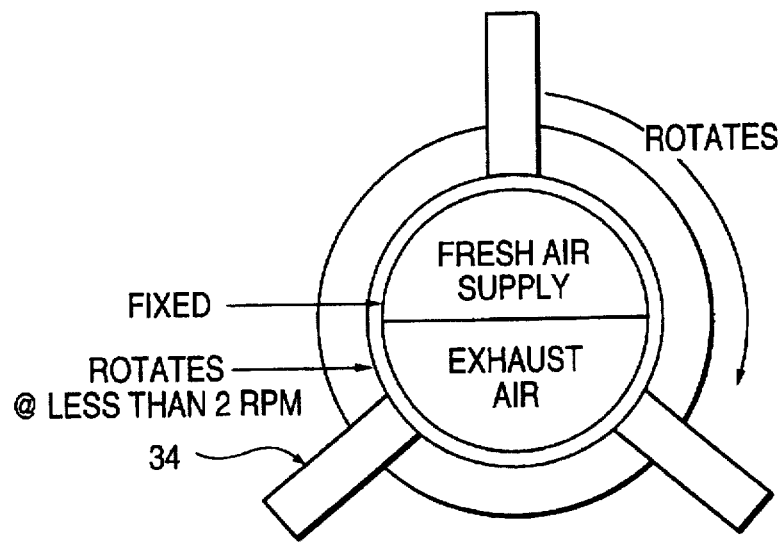
FIG. 8B is a section of a dual rotary joint.
Figure 8C:
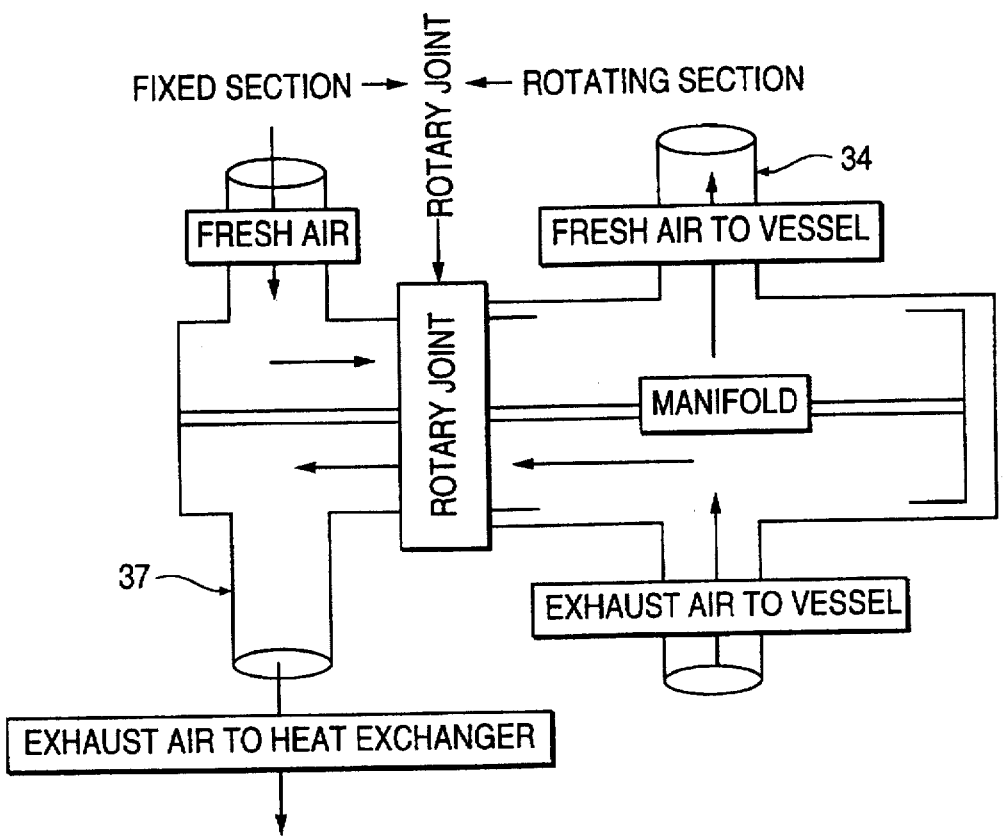
FIG. 8C is a schematic of a dual rotary joint.

The transfer doors 16 between the longitudinal sections may be of any desired design. An example of a preferred design, when the transverse chambers are triangular, is shown in FIGS. 5A and 5B. The transfer door 16 is a movable section of the bulkhead 15 that is supported on three stabilizer shafts 17 and may be moved forward and back by a transfer door actuator shaft 18 that runs; the full length of the vessel 8. This shaft 18 may also act as the watering pipe that adds water to the compost. The shaft 18 can be moved forward and backward either by a mechanical screw device or by an electro-mechanical actuator. In an optional embodiment the transfer door 16 may be opened and closed by a electro-mechanical device located on the outside surface of the vessel adjacent to the transfer door 16.

As seen in FIGS. 3 and 4, the interior of the rotating vessel 8 may have longitudinal parallel rows of agitation vanes 13 and impact wear plates 14. The agitation vanes 13 and wear plates 14 protrude perpendicular from the chamber side walls. The agitation vanes 13 serve to lift portions of the composting mass and drop it forward as the vessel 8 rotates. The impact wear plates 14 serve to act as pockets for the compost to fill, thus reducing the impact load as the tumbling compost falls off the agitation vanes 13 onto the pockets of compost rather than falling directly onto the wall plate.

The vessel is generally installed on a slope with a preferred slope of, generally less than 10%, for example, of approximately 1% to 5%.

The vessel may be rotated using means suitable for allowing the rotation. For example, the exterior of the vessel 8 may have circular rings 19 spaced as desired, preferably in industrial applications approximately 10' to 40' spacing. These rings allow the polygon vessel 8 to rotate on the idler wheels 21. The diameter of the rings may be as desired. In industrial applications, the preferred ring diameter is approximately 25' to 30'. Each ring 19 is supported by transverse precision cut gusset plates 20 that are the inside diameter of the ring 19 on the outside and conforms to the polygon shape of the vessel 8 on the inner side. Additional longitudinal gusset plates, perpendicular to the transverse gusset plates, may be added, as necessary for structural requirements. Each ring 19 rests upon two idler wheels 21 that are supported on a shaft in a housing assembly 21 that is anchored to a concrete pier 22. The idler wheels 21 will be as large or small as necessary to support the weight of the vessel 8. The preferred design is for each idler wheel 21 to support approximately 125,000 pounds or 250,000 pounds per ring 19. The concrete piers 22 are located so as to support the rotating vessel 8 on a slope. The slope of the vessel 8 with its lifting agitation vanes 13 provides a natural forward movement of the composting mulch as the vessel 8 rotates. The preferred slope of the rotating vessel 8 is 2% to 4%.

The horizontal thrust of the sloped rotating vessel 8 may be restrained by a horizontal thrust wheel assembly(ies) 23 and/or a helical gear ring 24 and helical pinion 25. This vertically shafted wheel is preferably located at the bottom longitudinal centerline of the rotatable vessel 8 and bears against the side of the ring 19 and precision cut gusset plate 20 and/or gear ring 24.

The vessel 8 may be rotated in any desired manner. A preferred method of vessel 8 rotation is a conventional helical gear ring 24 and helical pinion 25 powered by an electric motor 26 through a gear box/speed reducer 27. The speed of rotation may be as desired. The preferred speed of rotation will be 20 to 120 revolutions per hour or as necessary to optimize composting in the vessel 8.

Access ports 28 may be provided on the exterior side wall of each chamber of the vessel 8 to provide visual inspection and sample taking to monitor the carbon-nitrogen ratio of the composting material. When fully composted the sliding doors 29, that are located in each transverse chamber at the extreme far end of the vessel 8, are opened to allow the mature compost to fall out of the vessel 8 into a hopper [not shown] to be conveyored to the final processing and shipping area.

Water will be supplied into each chamber of vessel 8 as desired and in any manner desirable. For example, an approximate 52% moisture content of the composting mass has been found to be optimum. To maintain this approximate water content, for example, water may be added via a flexible water hose with a male quick disconnect 30 that is inserted into the matching female quick disconnect attached to a water pipe 18 that extends the full length of each chamber of the rotating vessel 8. It is advantageous that the water pipe 18 extend the full length of the vessel 8 to allow for the uniform addition of water, and therefore more optimum composting. Advantageously, this water pipe 18 may also act as the transfer door actuator shaft 18. Alternatively, the water may enter the vessel 8 in a similar manner as the supply of air per FIGS. 5A and 5B.

To prohibit foul odors generated by the incoming solid waste in the pre-processing area from escaping into the surrounding community, it is preferred that a building air handling system maintains the Tipping Floor Building and pre-processing areas under negative air pressure. The building air handling system advantageously exhausts air from these areas into the Composting Building where the process air for each rotating vessel 8 will be extracted from within the Compost Building.

Each transverse chamber in each longitudinal section of each rotating vessel 8 is advantageously monitored and controlled by a programmable controller 36 to control individual air temperature, air volume, and air velocity in each chamber in each section of each rotating vessel 8. The ventilation system will utilize standard equipment to provide this multiple zone control in each rotating vessel 8.

Figure 9A:
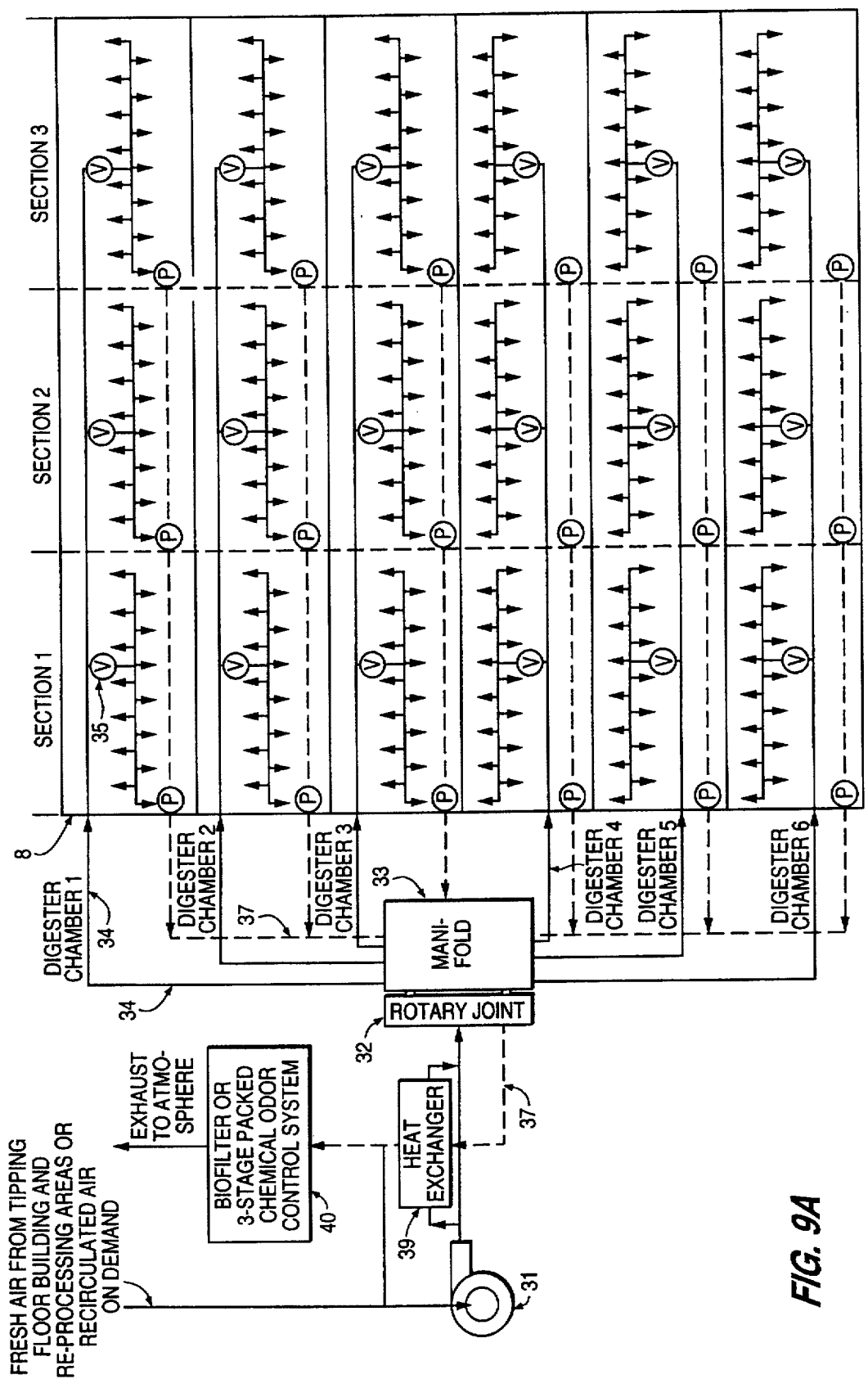
FIG. 9A is a schematic of an alternative embodiment of the vessel ventilation system.
Figure 9B:
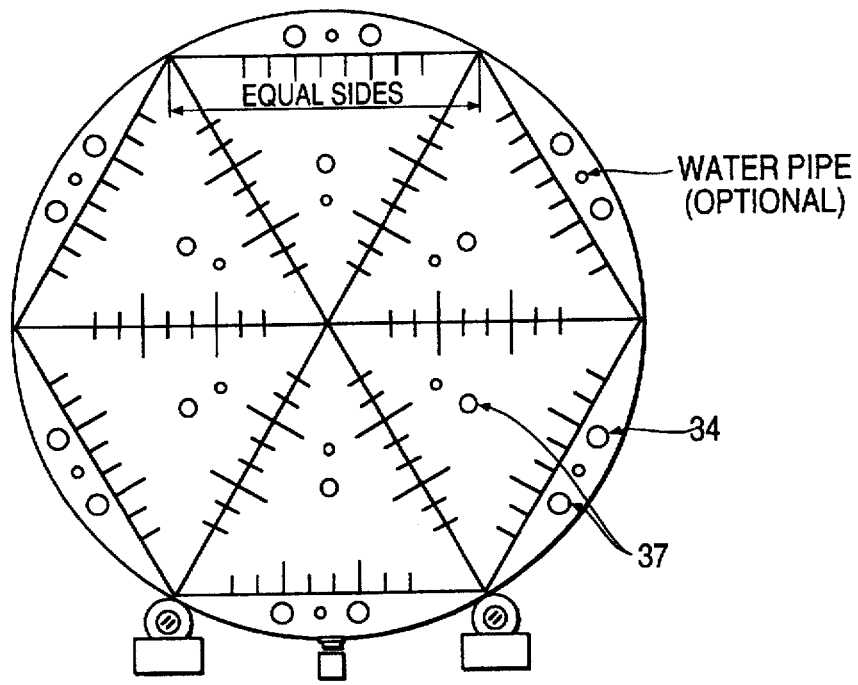
FIG. 9B is a section of an exhaust air anti-clogging assembly.
Figure 9C:
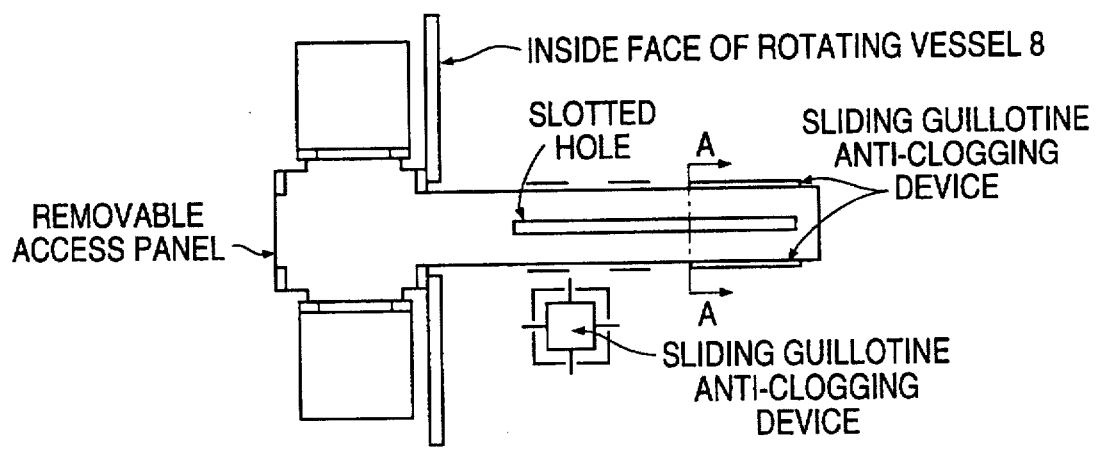
FIG. 9C is a schematic of an exhaust air anti-clogging assembly.

The oxygen requirements of the composting mass are provided in any desired manner so as to maintain aerobic composting conditions, for example, see FIGS. 9A, 9B and 9C. For example, air may be provided by the blower 31 (or compressor), which receives its input air from the Tipping Floor Building and pre-processing areas, pushes that air, under pressure, through a custom designed dual rotary joint 32 that allows the simultaneous input of fresh process air and the exit of exhaust process air. Furthermore, the fixed dual path into a rotating manifold 33 is preferably designed to continuously alternate the air pipes 34 from supply to exhaust. This alternating of supply and return air serves to continually "blow out" the air discharge/intake holes that are located longitudinally along the length of the pipes 34, which are advantageously located in the corners of the triangular chamber, inside the rotating vessel 8. Without this alternation, the moist sticky compost would likely quickly plug the return air holes.

An electro-mechanical air volume control valve 35 may be located outside the vessel 8 in each air pipe 34 so the industrial programmable controller 36 can regulate the volume of air upon command. Exhaust air 37 may be ducted through a bio-filter 40 (or three-stage packed chemical odor control system) on its way into the atmosphere. Upon command from the controller 36, the warm exhaust air 37 may be routed through a heat exchanger 39 to recover that heat. Thus, the fresh air can either be routed, upon command from the controller 38, through the heat exchanger 39 to warm the fresh air or routed directly into the vessel 8 to maintain preferred composting temperature ranges from about 118° F. to about 150° F. Air pressure 40 and volumeter (air velocity meter) 41, or other such devices as required, are utilized to monitor and control the ventilation system.

For an alternative embodiment see FIGS. 9A and 9B and 9C. The oxygen requirements of the composting mass are provided by a blower 31 (or compressor), which receives its input air from the Tipping Floor Building and pre-processing areas. The blower pushes that air, under pressure, through a custom designed dual rotary joint 32 that allows the simultaneous input of fresh process air and the exit of exhaust process air. The supply air is ducted alongside the exterior of the vessel 8 and enters each composting chamber near its longitudinal center of each section. There it enters perpendicularly into a distribution duct or pipe that is centered within the chamber and runs its full length discharging air through holes or slots located radially around the pipe with spacing as required. The process air is exhausted from each composting chamber in each longitudinal section through an Exhaust Air Anti-Clogging Assembly in one or more locations within each composting chamber in each longitudinal section. The process air is then ducted or piped, external to the vessel 8, back the length of the vessel 8 to a manifold 33 connected to the dual rotary joint 32 where it exits the rotary vessel 8 and is routed first through a heat exchanger 39 then through a bio-filter or three-stage packed chemical odor control system 40 before being exhausted outside of the building into the atmosphere. An electro-mechanical air volume control valve 35 is located outside the vessel 8 in each air pipe 34 so the industrial programmable controller 36 can regulate the volume of air upon command. Exhaust air 37 will be ducted through a bio-filter (or three-stage packed chemical odor control system) 38 on its way into the atmosphere. Upon command from the controller 36 the warm exhaust air 37 will be routed through a heat exchanger 39 to recover that heat. Thus the fresh air can either be routed, upon command from the controller 38, through the heat exchanger 39 to warm the fresh air or routed directly into the vessel 8 to maintain preferred composting temperature ranges from 118° F. to 150° F. Differential Pressure Gauges and Pitot Tubes, or other such devices as required, are used to determine the velocity and volume of air exiting each chamber.

Another embodiment is to replace a single large blower 31 for each vessel 8 with individual supply blowers or exhaust fans (not shown) for each chamber in each longitudinal section of the rotating vessel 8. These blowers or fans may be mounted on the rotating vessel 8 with electrical power entering the vessel 8 via a slip ring. Preferably they will be direct drive pressure blowers with variable frequency drive motors remotely controlled by the programmable controller. The intake supply air will be taken from within the Compost Building, which obtains its intake air from the Tipping Floor Building and pre-processing areas. The intake supply air can take two paths upon call by the programmable controller: 1) With the compost building acting as a plenum the intake supply air can directly enter the pressure blower. With this option the air may be pre-heated by conventional electrical duct heaters when necessary to provide optimum composting conditions. 2) When the intake supply air needs to be pre-heated to provide optimum composting conditions, this is accomplished by drawing the air through piping routed through the heat exchanger, the rotary joint into the rotating vessel, and to the individual pressure blower. Thus each chamber within the rotating vessel 8 will be individually controlled to be able to advantageously vary the volume, velocity and temperature of the process air to provide and maintain optimum composting conditions.

Sensors may be strategically located inside the vessel 8 and in various piping located inside and on the outside of the vessel 8. These sensors are connected to a programmable controller 36 through a signal rotary joint 42 and or similar commercially available device such as a slip ring to transfer the signal in and/or out of the rotating vessel 8. Sensors may include but, are not limited to, oxygen 43, carbon dioxide 44, temperature 45, pH 46, water content 47, ammonia 48, methane 49, and hydrogen sulfide 50. These sensors provide the intelligence necessary for the programmable controller 36 to direct the composting process to, for example, increase or decrease agitation, increase or decrease air velocity and/or volume, increase or decrease air temperature, add water, etc.

By opening the sliding doors 29 located in the exterior side walls at the end of each chamber of the last longitudinal section of the vessel 8, the mature compost exits by falling through the door opening into, for example, a hopper (not shown) as the vessel 8 rotates. The hopper terminates on a conveyor that carries the compost to the final processing area where it first goes through a drying oven 51, if necessary, to reduce the moisture content, for example, to below 40%. Next the compost is conveyored into a rotary screen 52 for final sorting by size as selected by the end user. The compost is now ready for shipping. It is noted, that the compost leaving the vessel 8 may be after treated in any desired manner, depending on the needs of the customer.

An advantage of the present apparatus is that it can be fabricated at the site where it will be used, without the size limitations imposed by normal shipping requirements. This is because the rotatable vessel 8 is preferably of a polygon shape, and hence metal plates of any desired size can be welded together to form any size vessel 8. The apparatus can be assembled in any desired manner so long as an apparatus as described herein is produced. Also, if desired, for example, if a smaller sized vessel is desired, the vessel 8 can be fabricated in a factory and shipped to a site. However, if a large size vessel 8 is used, it is desirable to fabricate the vessel 8 at the site where it will be used.

In a preferred field fabrication of the vessel 8, the fabrication will comprise the assembly of shop prefabricated components and large side wall plates of individual sizes up to 12.5' wide by up to 104' long that will be shipped directly from the mill to the job site. Plate thickness shall be as structurally required, for example, from ¼" to ¾" thick.

The assembly at the site will generally include the following steps:

Concrete piers 22 of such size as structurally required will be poured at desired intervals the length of the vessel 8. The top elevations of each pier 22 will be carefully set to the desired slope and shall be poured with an embed to receive the idler wheel shaft and housing assembly.

The idler wheel shaft and housing assembly units 21 are aligned with respect to the vertical, horizontal, and longitudinal centerlines and are attached to the matching embed in the pier 22.

Adjacent sections of the shop precision cut gusset plates 20 will be welded or bolted to a segment of the cylindrical ring 19 to form approximately one half of the total ring. Additional similar partial assemblies will be completed and lifted by a truck crane and set onto the idler wheels. Temporary cross bracing will be used to hold the ring/gusset sub assemblies in an erect position.

The 1st wall plates will be set against the aligned precision cut gusset plate 20 to form the initial side walls of the vessel 8. Additional segments of the ring assembly and wall plates will be set in place with the crane as a welding process joins each plate into a water tight vessel 8 having a polygon shape.

Shop prefabricated end plates (not shown), agitation vanes 13, wear plates 14, access ports 28, longitudinal bulkheads 15 with transfer doors 16, stabilizer shafts 17, and sliding doors 29 are welded into place in known manners as the fabrication proceeds down the length of the vessel 8.

Shop fabricated slotted air 34 and water pipes 18 are connected through the end walls and bulkhead walls 15.

The Gear Ring 24 is bolted or welded to precision cut gusset plates 20 and the motor-speed reducer-shaft-pinion assembly 25, 26, 27 is installed as are the horizontal thrust wheel assemblies 23.

The desired rotary joints, sensors, gauges, dampers, water, and air connections are installed.

The vessel 8 is now ready for field startup inspection.

The apparatus and method of the present invention can be used to compost any type of organic waste, including MSW, sewage waste, yard waste, and the like. If MSW is used, it is often desirable to remove inorganic materials, such as metal cans, glass and ceramic materials, bricks, stones, and organic materials such as rubber and plastic objects which will not compost, from the MSW prior to adding the MSW to the composting apparatus. This removal of inorganic material can be accomplished in any desired manner, for example, by manually removing the inorganic materials, or by using mechanical devices such as 3, 4, and 5 discussed above.

The processed MSW may now be placed into the vessel 8. It can be supplemented with, for example, up to about 70% sewage sludge, about 25% preferred, or other nitrogen sources to accelerate the digestion if the MSW input carbon content is too high, about 30 to 1 ratio of carbon to nitrogen is optimum. If the nitrogen content is too high, carbon sources, for example, in the form of leaves, cardboard, paper, etc., may be added. Also, a minimum amount of existing compost can be added to the MSW, either in the vessel 8 or prior to the entry into the vessel 8, to obtain the aerobic bacteria to jump start the new batch. Chemical additives are preferably used only at a minimum, and only if economically practical.

As discussed above with reference to wet mill 1, it is often desired to subject the organic material to be composted to a grinding or shredding operation prior to the material entering the vessel 8. This shredding and grinding can take place inside the elongated rotatable vessel 8, for example, as described in U.S. Pat. No. 3,930,799, or prior to the biodegradable waste entering the vessel 8 in a wet mill 1 and/or pulverizer blower 7.

As discussed above, in the preferred industrial applications, the vessel 8 of the present invention is divided into a plurality of transverse chambers and longitudinal sections, which may be formed in any desired manner. For example, steel plate, other metal plates, or suitable composite materials can be used to form the transverse chambers within the vessel 8. Small vessels 8 can be formed without interior transverse chambers. For example, steel plates up to 12', 6" wide and up to 104' long can be used to fabricate the elongated vessel 8 and the interior chambers. If at least one, preferably steel plate, is used, there will be two transverse chambers. By using more metal plates, more than two chambers can be formed. For example, three, four, five, six, seven, eight, etc., chambers can be formed. When the vessel 8 has a polygon shape, as is the preferred embodiment, the transverse chambers will also have a polygon shape, for example, be in the form of equilateral triangles.

The vessel 8 of the present invention may have any desired shape, such as cylindrical, however, due to the advantageous fabrication techniques developed by the present inventors, the vessel 8 is preferably fabricated as a polygon, such as a hexagon, using metal plates. The straight metal plates form the sides of the vessel 8, as well as forming the interior chambers. The polygon shape of the vessel 8 offers advantages over conventional cylindrical containers, since the polygon vessels 8 can be fabricated on site and allow for a vessel 8 of increased length and diameter as compared to conventional cylindrical containers. Moreover, the plates need not be shaped into cylinders as in the prior art cylindrical drums. The metal plates used to construct the elongated vessel 8 may have any desired thickness.

The longitudinal sections may contain one or more doors which may be closed or opened to allow passage of the organic material from longitudinal section to section. The longitudinal sections may be further divided into additional transverse chambers, thereby forming a honeycomb shaped cross section of vessel 8.

The vessel 8 may be fabricated of any desired materials; for example, of steel, other metals, composites, and/or plastics.

The internal volume of the vessel 8 may be divided longitudinally by a plurality of agitation vanes which are supported by a plurality of transverse structural members which may be pipes and/or tubes, that may also serve to distribute air and/or water throughout the volume of the vessel. These longitudinal agitation vanes are so located that, as the vessel rotates, the organic composting material within the vessel is continuously being lifted, dropped, aerated, and may be sprinkled with water upon demand. In this embodiment, totally enclosed chambers are not required to economically aerate the composting material. Thus, there can be used a twelve-sided polygon with a support ring around it, wherein longitudinal vanes are in the polygon, but do not form enclosed chambers.

An advantage of the present invention, is that it is possible to fabricate the vessel 8 in the field, in sizes much larger than previously contemplated. For example, conventional rotating drums generally have a diameter of no larger than 12.5' and a length of no longer than 185'. Using flat metal plates to construct the elongated vessel 8, a polygon shaped vessel 8 can be formed having a diameter of more than 15'; for example, from 20' to 40'. The length of the instant vessel 8 can easily be varied; for example, 40' to 1,000', by using the appropriate length of metal plates, or by connecting more than one metal plate, for example, by welding.

Fabricating the vessel 8 in a polygon shape with intermittent rings 19 at the support points enables efficient field fabrication by using flat steel plates up to 12', 6" wide by up to 104' long rather than having to bend the plates into a cylinder. Bending thick plates in the field is extremely difficult and expensive. Fabrication of a vessel 8 as a polygon with straight plate is more economical than fabrication of a cylindrical drum.

The larger volume of the instant vessel 8 is of particular advantage with respect to reducing odor and reducing overall cost in a composting process. The containment volume of the vessel 8 should be sufficiently large to permit the retention of the composting waste material for the duration of the composting process.

The elongated vessel 8 may be either horizontal or tilted at an angle, for example, of less than 10 degree, to the horizontal. By tilting the vessel 8, the movement of material from the entry to the exit is facilitated by the action of gravity. The vessel 8 may be tilted in any desired manner, for example, by mounting and supporting the vessel 8 at the entry at a higher level than at the exit. Typically a tilt angle or slope of two to four degree from the horizon is useful to allow the slow advance of the tumbling mass through the vessel 8. The greater the slope the faster the advancement of the compost and the greater the horizontal thrust. Too much slope will create much higher air pressure to force air through the deeper compost mass. Higher air pressure means more blower or compressor horsepower to maintain optimum ventilation of the compost, thus greater operating costs.

The vessel 8 may be supported in any desired manner. For example, by support piers 22 as discussed above. The vessel 8 may be rotated in any desired manner, for example, by the manner discussed above with reference to the Figures. The rate of rotation is controlled so as to maintain an aerobic condition inside the vessel 8. The rotation may be computer controlled, the speed being varied depending upon readings such as temperature 45 located in the vessel 8, thereby ensuring optimum aerobic composting conditions.

Water, air, and speed of rotation of the elongated vessel 8 may be controlled by a programmable controller 36. Sensors 43–50, as required, may be provided in vessel 8, to feed data to the computer. It may be advantageous to locate the sensors within the elongated vessel 8, rather than at external points, to ensure quality of the composting material. The programmable controller 36 connects to sensors 43–50 inside the rotating vessel 8 to regulate the composting process. Process feedback allows controller 36 to optimize the biodegradation processes, and to monitor and control all aspects of the process such as diversion of contaminated waste, dilution, moisture content, ventilation, temperature, and ph.

Continuous automated chemical monitoring complete with hard copy printouts may be produced. By use of the controller 36 and hard copy printouts, it is possible to provide certification that the mature compost is free of hazardous content and is in conformance with all Federal, State, and Local regulations.

The controller 36 may include intelligent computerized feedback control programs such as expert systems and artificial neural networks so that the controller can continuously "learn" from previous process performance and can be used to maintain the desired parameters in the composting material, especially maintaining aerobic conditions.

Continuous aeration of compost and exhausting of oxygen depleted air inside the vessel 8 via an exhaust air duct (pipe), as discussed above with reference to FIG. 6, versus exhausting only at one end provides efficient aeration and composting. The air, or other gas containing oxygen, may be added and removed from the vessel 8 in any desired manner, for example, as discussed above with reference to the Figures. For example, fresh air may be supplied to the composting mass by continuous forced aeration and mechanical agitation or rotation of the elongated container. The temperature, volume, and velocity of the air may be varied, as well as the path of the air. For example, air may enter and/or exhaust the vessel via one or more longitudinal pipes or ducts; or air may enter and/or exhaust at one end of the vessel 8; or air may enter and/or exhaust the side wall of each chamber in each section of vessel 8. The aeration means of U.S. Pat. No. 5,169,782, may also be used, however, the methods described therein are often disadvantageous since air is provided from the inside, but only exhausted at one end. The present inventors have found it advantageous that air is introduced along the full length of the container so as to maintain aerobic conditions. It is also important to provide efficient composition and composting, that exhaust oxygen is continuously removed along the whole length of the container, for example, via an exhaust air or Exhaust Air Anti-Clogging Assembly(s) located in each chamber of the vessel 8, rather than exhausting air only at one end.

It is also advantageous to add water the full length of the vessel 8. The ability to add water upon call throughout the vessel 8 ensures efficient composting. The water maybe added in any desired manner, for example, as discussed above with reference to the Figures. It is important that the moisture content be controlled to ensure efficient composting; therefore, it is essential to have the ability to add water upon call. For example, to maintain the desired moisture content of the compost, the present inventors have found it desirable to supply water, for example, through a rotary joint to distribution piping extending the full length of the vessel 8.

As discussed above, a heat exchanger 39 may be used to capture the heat from the exhaust air and use this to preheat fresh supply air to maintain the desired temperature, along with supplementary heat when required, for maximum efficiency of composting. That is, in the composting process it is useful to recover the heat generated by the compost microorganisms; for example, from the exhaust process-air stream. The recovered heat can be recycled into the apparatus; or if desired, further thermal energy through electrical heaters may be utilized, to control process temperature so as to optimize the biodegradation process by helping to sustain the high-rate thermophilic digestion for the longest duration that is feasible. It is desirable to maintain an elevated temperature of about 118° F. to about 150° F., in the vessel thereby achieving optimum composting through the process.

The heat recovery and control system may be controlled to achieve further reduction in the pathogens in the compost arising from the pathogens that may be present in the waste stream by maintaining the temperature of the compost above the required temperature for the required period of time.

When used as a composter, the vessel 8 offers numerous advantages over conventional cylindrical, single-chamber drums. For example, each of the chambers acts as a separate composting area, allowing quicker composting by providing more surface area for the aerobic conditions to function to compost the organic materials. This allows for batch processing and the enormous sizes of the vessel 8 makes it practical to have retention times of longer than three days. Also, the water, air, temperature, etc., can be controlled within each individual chamber, thereby facilitating optimum composting conditions. The organic material can be retained in the vessel 8 until the completion of composting, eliminating the need for further composting in a windrow. Thus, the odors can be controlled within the vessel 8 of the present invention, by leaving the organic material into the vessel 8 until the compost is fully matured.

It is expected that this continuously rotating vessel 8 will produce mature compost in less than 30 days, for example, under 21 days or even less than 10 days by maintaining the preferred thermophilic aerobic digestion of the organic waste. Prior composting systems primarily digest solid waste anaerobically, which is much slower.

It is also advantageous to carry out the present invention in a batch manner. This allows for control of the composting until it is fully matured by appropriate control of retention time, water, temperature, and air.

During the composting process, it is preferred to frequently monitor the quality, in terms of the concentrations of trace heavy metals and other undesirable contaminants, of each batch of the feed waste material as it progresses through the apparatus, so that any batch of feed which indicates unacceptably high levels of contaminants maybe separated and diverted away from the rest of the composting material in the process train.

It is also useful to have a quality control procedure, wherein computerized "hard copy" printouts of the measured parameters are produced as each batch of waste material progresses through the process train, so that certifications and/or the "history" of a batch of finished compost can be furnished to a customer.

The rotatable vessel 8, due to its inventive design, can be used in numerous industries. For example, it can be used to compost waste as described above. Also, as discussed above, it can be used as a wet mill 1 to reduce the size of waste material, to thoroughly mix the incoming waste, and screen by size the waste steam exiting the wet mill 1.

Also, the polygon rotatable vessel 8 can be used in any areas where it is desired to have a large rotating vessel, which is desired to be constructed on the site of use. For example, a polygon rotatable drum as discussed above, can be used as a cement kiln or ball mill. Such vessels will be modified to achieve the intended purposes, that is, conventional cements kilns and ball mills are modified according to the present invention, to have a polygon shape, so as to allow for fabrication on site of a large vessel 8. The polygon shaped vessel 8 is then modified to be useful as a cement kiln or ball mill. Thus, much larger sizes of vessels can be used without limitation to shippable sizes, and without paying a much higher cost to field fabricate an equivalent sized cylindrical cement kiln or ball mill.

It is intended that the detailed description of preferred embodiments be considered as exemplary only. Other embodiments of the invention will be apparent to those skilled in the art from consideration of the specification and practice of the invention disclosed herein.

What is claimed is:

1. A rotatable apparatus adapted to facilitate the composting of organic matter comprising:

an elongated vessel having a longitudinal axis and an internal volume, wherein the elongated vessel is rotatably mounted about its longitudinal axis, and wherein the elongated vessel has a polygonal cross-section, and wherein the elongated vessel is divided into a plurality of transverse chambers and a plurality of longitudinal sections, a vessel inlet for receiving material, a vessel outlet for removing material, means for introducing fresh air into the vessel, means for removing spent air from the vessel, means for allowing electrical power and electric signals to travel into and out of the vessel, means for introducing water into the vessel, sensors inside the elongated vessel for monitoring conditions during the composting, a programmable controller connected to the sensors which monitors and controls the conditions measured by the sensors, means for rotating the vessel on its longitudinal axis, such that the axis of rotation is either horizontal or at an angle inclined up to ten degrees to the horizontal, and means for continuous loading and continuous unloading the material.

2. An apparatus as claimed in claim 1, wherein the transverse chambers each have a polygonal cross-section.

3. An apparatus as claimed in claim 2, wherein the transverse chambers each have a triangular transverse cross-section.

4. An apparatus as claimed in claim 1, wherein the elongated vessel has a hexagonal transverse cross-section.

5. An apparatus as claimed in claim 1, which comprises six transverse triangular chambers within each of two or more longitudinal sections of the vessel.

6. An apparatus as claimed in claim 1, wherein the means for rotating the vessel comprises circular rings attached to the exterior of the vessel via gusset plates, which are spaced at intervals to support the vessel and allow for the rotating of the vessel by providing force to the circular rings.

7. An apparatus as claimed in claim 1, wherein the elongated vessel is fabricated from plates which form the outside of the vessel, form the internal transverse chambers, and form bulkheads/transfer doors, which define the longitudinal sections.

8. An apparatus as claimed in claim 1, which comprises horizontal support means for rotatably supporting the elongated vessel such that the longitudinal axis of the elongated vessel is horizontal or inclined at an angle relative to the horizontal.

9. An apparatus as claimed in claim 1, comprising a dual rotary joint attached to the periphery of the elongated vessel that allows for the simultaneous input of fresh air and the exit of exhaust air.

10. An apparatus as claimed in claim 1, comprising means for providing air to each chamber of desired volume, velocity, and temperature to maintain aerobic composting conditions in each chamber, and means for removing exhaust air from each chamber, and optionally means for the remote programmable control of the volume, velocity, and temperature of said air.

11. An apparatus as claimed in claim 1, wherein the longitudinal sections are defined by bulkheads, which comprise apertures which can be opened or closed.

12. An apparatus as claimed in claim 1, wherein the means for rotating the vessel on its longitudinal axis, are such that the axis of rotation is at an angle inclined from one to ten degrees to the horizontal.

13. An apparatus as claimed in claim 1, comprising means for providing air to each chamber of the vessel.

14. An apparatus as claimed in claim 1, comprising means for providing water each chamber of the vessel.

15. An apparatus as claimed in claim 1, comprising means for controlling the temperature in each chamber of the vessel.

16. An apparatus as claimed in claim 1, wherein the sensors monitor temperature and oxygen content and the content of gases.

17. An apparatus as claimed in claim 1, wherein the vessel has a diameter of more than fifteen feet.

* * * * *